(12) United States Patent
Mizuno et al.

(10) Patent No.: US 9,404,437 B2
(45) Date of Patent: Aug. 2, 2016

(54) ENGINE CONTROL APPARATUS PERFORMING AUTOMATIC ENGINE RESTART FOR ENSURING BRAKE BOOSTER ASSISTANCE AFTER AUTOMATIC ENGINE STOP

(71) Applicant: DENSO CORPORATION, Kariya-city, Aichi-pref. (JP)

(72) Inventors: Satoru Mizuno, Okazaki (JP); Kenji Kawahara, Kariya (JP)

(73) Assignee: DENSO CORPORATION, Kariya (JP)

( * ) Notice: Subject to any disclaimer, the term of this patent is extended or adjusted under 35 U.S.C. 154(b) by 751 days.

(21) Appl. No.: 13/758,128

(22) Filed: Feb. 4, 2013

(65) Prior Publication Data

US 2013/0204512 A1 Aug. 8, 2013

(30) Foreign Application Priority Data

Feb. 2, 2012 (JP) ................................. 2012-020552

(51) Int. Cl.
*F02D 45/00* (2006.01)
*F02N 11/08* (2006.01)

(52) U.S. Cl.
CPC .............. *F02D 45/00* (2013.01); *F02N 11/084* (2013.01); *F02N 2200/0801* (2013.01); *F02N 2200/0807* (2013.01); *F02N 2300/2011* (2013.01); *Y02T 10/48* (2013.01)

(58) Field of Classification Search
CPC . F02N 11/08; F02N 11/0814; F02N 11/0818; F02N 11/0833; F02N 11/084; F02N 2200/0807; F02N 2200/124
See application file for complete search history.

(56) References Cited

U.S. PATENT DOCUMENTS

| 6,334,834 B1* | 1/2002 | Mizutani | B60T 13/585 477/203 |
| 2002/0116113 A1* | 8/2002 | Kaneko | F02D 41/065 701/112 |
| 2003/0004635 A1* | 1/2003 | Kamiya | B60K 41/202 701/112 |
| 2011/0256980 A1* | 10/2011 | Saito | B60W 10/06 477/183 |
| 2013/0000296 A1* | 1/2013 | Crombez | B60T 13/52 60/547.1 |
| 2013/0179053 A1* | 7/2013 | Matsunaga | B60W 10/02 701/112 |

FOREIGN PATENT DOCUMENTS

| EP | 0 990 793 A2 | 4/2000 |
| JP | S59-17246 U | 2/1984 |
| JP | 2001-173477 A | 6/2001 |
| JP | A-2006-83830 | 3/2006 |
| JP | A-2006-321268 | 11/2006 |
| JP | A-2010-248917 | 11/2010 |

OTHER PUBLICATIONS

Dec. 9, 2014 Japanese Office Action issued in Application No. 2012-020552.
Mar. 24, 2015 Office Action issued in Chinese Application No. 201310037571.8.

* cited by examiner

*Primary Examiner* — Erick Solis
*Assistant Examiner* — Anthony L Bacon
(74) *Attorney, Agent, or Firm* — Oliff PLC (57) ABSTRACT

On a vehicle equipped with a vacuum-assist type of brake booster utilizing the intake air pressure of the vehicle engine, an engine control apparatus automatically stops the engine under certain conditions and subsequently automatically restarts the engine if it is determined that the brake booster pressure has fallen below a predetermined value. The engine control apparatus also effects such automatic restarting if a predetermined maximum time interval has elapsed since the automatic engine stop occurred. This ensures that even when the booster pressure value cannot be reliably obtained after an automatic engine stop has occurred, the engine will be restarted before the booster pressure falls excessively.

4 Claims, 6 Drawing Sheets

VEHICLE SPEED

FIG.3B

BRAKE SWITCH STATUS

FIG.3C

BRAKE ACTUATION AMOUNT

FIG.3D

BRAKE BOOSTER PRESSURE

FIG.3E

COUNT VALUE C

FIG.3F

STARTER MOTOR

FIG.8

ENGINE CONTROL APPARATUS PERFORMING AUTOMATIC ENGINE RESTART FOR ENSURING BRAKE BOOSTER ASSISTANCE AFTER AUTOMATIC ENGINE STOP

CROSS-REFERENCE TO RELATED APPLICATIONS

This application is based on and incorporates herein by reference Japanese Patent Application No. 2012-20552 filed on Feb. 2, 2012

BACKGROUND OF THE INVENTION

1. Field of Application

The present invention relates to an engine control apparatus for an internal combustion engine of a vehicle, and in particular to an engine control apparatus having an idling stop function.

2. Background Technology

Types of vehicle engine control apparatus are known having an idling stop function, whereby the engine is stopped automatically when the apparatus detects a first type of condition (e.g., the vehicle brakes are applied while the vehicle speed is low, or the vehicle becomes halted) and is automatically restarted when a second type of condition is detected (e.g., actuation of accelerator pedal). This serves to reduce fuel consumption, by reducing the extent of engine idling.

Motor vehicles are generally equipped with a vacuum-boost type of braking assistance system, for augmenting the force applied by the vehicle driver in depressing the brake pedal. Such a system uses a brake booster which employs the difference between atmospheric pressure and the engine intake air pressure (intake manifold pressure) while the engine is running, to generate a braking assistance force. The magnitude of that difference (a negative pressure value) is referred to in the following as the booster pressure. When the engine is stopped, a sufficient level of booster pressure will be maintained for a short time, so that braking assistance will temporarily continue.

It has been proposed, for example, in Japanese patent first publication No. 2006-83830, to detect the changes which occur in the booster pressure after the engine has become halted, and to generate a command for restarting the engine if the booster pressure is judged to have fallen below (i.e., become less negative than) a predetermined value. The reason for this proposal is to prevent a problem whereby the vehicle driver actuates the brake pedal subsequent to the engine having been automatically halted, and may feel alarmed because the normal degree of braking assistance is not being provided, due to an excessive drop in the booster pressure.

However with such a method, utilizing a pressure sensor for detecting the level of booster pressure, it is possible that the actual value of booster pressure may not be obtained, e.g., when the pressure sensor becomes defective. This may lower the detection accuracy to such an extent that, even if the booster pressure has fallen excessively, that condition will not be detected. Thus continuation of a normal degree of braking assistance, after an automatic engine stop operation, cannot be reliably ensured.

SUMMARY

Hence it is desired to overcome the above problem, by providing an engine control apparatus whereby it is ensured that appropriate braking assistance is provided by a brake booster of a vehicle when the vehicle engine has become stopped by an automatic engine stop operation, even when the engine control apparatus cannot reliably monitor the booster pressure value.

From a first aspect, the invention provides an engine control apparatus which performs an automatic engine stop operation to halt combustion operations of an internal combustion engine of a vehicle when a predetermined condition for stopping the engine is satisfied, and for subsequently executing an automatic engine restart operation to restart the engine, when a predetermined restarting condition is satisfied. The invention is applicable to a vehicle equipped with a vacuum-boost type of brake booster. The engine control apparatus is characterized in comprising first judgement circuitry, second judgement circuitry and starting control circuitry, whose respective functions may be implemented by processing executed by a microcomputer. These functions are as follows.

After an automatic engine stop operation has been performed, the first judgement circuitry repetitively judges whether the booster pressure has fallen below a predetermined value. The second judgement circuitry judges whether a predetermined time interval has elapsed since the engine became halted by the engine stop operation. The starting control circuitry effects automatic restarting of the engine when either one of a first and a second predetermined condition for restarting becomes satisfied. The first condition for restarting is that the first judgement circuitry has determined that the booster pressure has fallen below the predetermined value, while the second condition is that the second judgement circuitry has determined that the predetermined time interval has elapsed since the engine become stopped. If at least one of these conditions occurs, the starting control circuitry executes an automatic engine restart in response to the earliest of the conditions to occur.

As a result, even if the engine control apparatus becomes unable to accurately obtain the booster pressure value (e.g., due to a defective sensor) it is ensured that after the vehicle engine has become halted by an automatic engine stop operation, the engine will become restarted after no more than a predetermined maximum-duration interval has elapsed. This interval is made sufficiently short to ensure that even under a worst-case condition for rate of fall of the booster pressure after the engine is stopped (such as when the vehicle driver is pumping the brake pedal), it can be expected that sufficient booster pressure will be maintained to ensure a normal level of braking assistance to the driver.

In particular the engine control apparatus is preferably configured such that, when it is detected that the vehicle speed has fallen to zero after an automatic engine stop has occurred, the apparatus inhibits automatic engine restarting in response to the predetermined time interval having elapsed.

The invention thereby enables the frequency of automatic engine restart operations to be minimized as far as possible, so that improved fuel economy can be achieved. When the vehicle has become halted, there will generally be no disadvantage if the level of braking assistance becomes insufficient, so that automatic engine restarting based on the predetermined elapsed time interval can safely be inhibited. However while the vehicle is in motion, it is ensured that the vehicle driver will not experience unease or danger due to the degree of braking assistance becoming insufficient, even if the booster pressure value cannot be reliably obtained.

From another aspect, the engine control apparatus can comprise means for detecting a specific status of the vehicle whereby the vehicle is moving downhill on a slope and the gradient of the slope exceeds a predetermined amount. If the vehicle is in motion but the specific status is not detected, or if the vehicle has become halted, restarting of the engine as a result of the predetermined time interval having elapsed is inhibited. If the specific status is detected, then engine restarting is performed when the predetermined time interval has elapsed after an automatic engine stop operation has occurred, while otherwise, such restarting is not performed.

This serves to reduce the frequency of automatic engine restarts. However if the vehicle is running (freewheeling) down a steep slope with the engine stopped, the manner of actuating the brake pedal by the driver may cause the booster pressure to become rapidly lowered. Hence in such a condition, it is ensured that the engine will be restarted no later than when a predetermined time interval time has elapsed, thereby restoring the booster pressure. Safety is thereby enhanced, since a normal level of braking assistance is maintained.

According to another aspect, the engine control apparatus can be provided with means for determining that the vehicle is running downhill on a slope, and for obtaining the gradient value of the slope. From that aspect, the second judgement circuitry can comprise setting circuitry which sets the duration of the predetermined time interval based upon the value of the gradient.

In that case, the steeper the slope on which the vehicle is running downhill with the engine having been stopped by an automatic engine stop operation, the shorter is made the maximum amount of time that can elapse before the engine becomes automatically restarted.

From another aspect, the engine control apparatus obtains the booster pressure value at the point in time when a condition for an automatic engine stop operation becomes satisfied (i.e., immediately before the engine becomes stopped), and sets the duration of the predetermined time interval based upon that booster pressure value. In that case, the lower the value of booster pressure immediately before the engine becomes halted by an automatic engine stop operation, the shorter will be the maximum duration that can elapse before the engine becomes automatically restarted.

DESCRIPTION OF PREFERRED EMBODIMENTS

Figure 1:
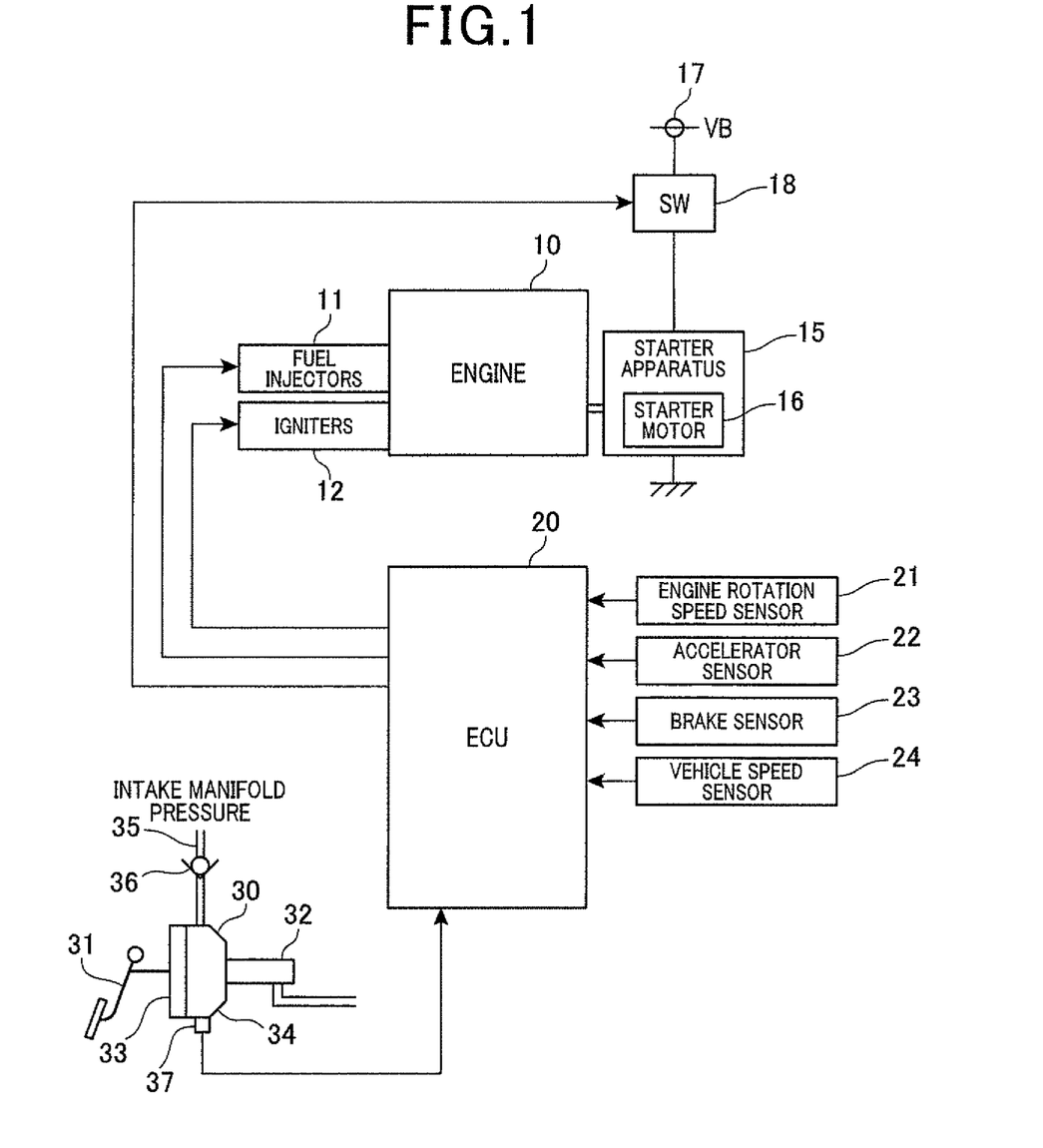
FIG. 1 shows the general configuration of an engine control system of a motor vehicle, according to a first embodiment of the invention.

An embodiment of an engine control system will be described referring first to FIG. 1, showing the general configuration of the system. The operation of the system is based on an ECU 20, which has various control functions including control of fuel injection quantities, control of ignition timings, idling stop control, etc.

In FIG. 1 an engine 10 is a 4-cylinder internal combustion engine, having fuel injectors 11 for injecting fuel into the cylinders, and an ignition unit 11 which generates high voltages for generating sparks in spark plugs of respective cylinders of the engine at appropriate ignition timings. The engine 10 also includes a throttle valve (not shown in the drawings) which is actuated by the vehicle driver by depressing the accelerator pedal, for controlling the rate of air intake into each of the cylinders. The engine 10 further is provided with a starter apparatus 15, having a starter motor 16 which is driven by power supplied from a battery 17. A starter switch 18 is connected in the circuit path between the battery 17 and the starter motor 16. Engine cranking is performed when the starter switch 18 is set in the ON (closed) state to thereby drive the starter motor 16, and is halted when the starter switch 18 is set in the OFF (open) state.

The starter switch 18 may be set in the ON state by the vehicle driver performing a manual actuation (e.g., turning an ignition key) for effecting engine starting. However the ECU 20 can also set the starter switch 18 to the ON state while the engine 10 is halted, by transmitting a starting command, in an operation for automatically restarting the engine 10.

The ECU 20 is an electronic control apparatus incorporating a known type of microcomputer (i.e., having a CPU, various types of memory, etc). The ECU 20 receives detection signals from various sensors of the system (an engine speed sensor 21, a accelerator sensor 22, a brake sensor 23, a vehicle speed sensor 24), and controls the fuel injection quantities, ignition timings, idling stop control, and driving of the starter motor 16, etc., based on these detection signals. The ECU 20 thereby can enable/halt combustion operations of the engine 10, by enabling/halting fuel injection and ignition operations.

The engine speed sensor 21 generates a square-wave pulse as a crank-angle signal each time the engine crankshaft attains a predetermined crank angle (e.g., 10° CA). The accelerator sensor 22 (e.g., an accelerator pedal stroke sensor) detects an accelerator pedal actuation amount, indicating the extent to which the accelerator pedal is being depressed by the vehicle driver. The brake sensor 23 (e.g., brake pedal stroke sensor) detects a brake actuation amount, indicative of the degree of force being applied to the brake pedal by the driver. In addition, a brake switch (i.e., brake light switch, not shown in the drawing) produces an ON/OFF switch signal indicating whether or not the brake pedal is being actuated, with that switch signal also being supplied to the ECU 20. The vehicle speed sensor 24 detects the vehicle speed.

The idling stop control function is executed by the ECU 20 of this embodiment as follows. When a predetermined condition for executing an automatic engine stop is satisfied, the idling stop control function acts to halt combustion operations of the engine 10, thereby halting the engine. Subsequently, when a predetermined condition for an automatic restart of the engine 10 is satisfied, the idling stop control function performs the automatic restart by recommencing combustion operations of the engine 10 and initiating engine cranking by the starter motor 16.

The required condition for executing an automatic engine stop can be for example: the vehicle speed has become lower than a predetermined value (such as 10 km/h), while the vehicle driver has either released the accelerator pedal (so that the engine is in an idling state) or has depressed the brake pedal. The required condition for performing an automatic engine restart can include, for example, occurrence of either of the following subsequent to an automatic engine stop: the accelerator pedal is depressed, or the brake pedal is released.

Also as shown in FIG. 1, the brake system of the vehicle includes a brake booster 30. In executing the idling stop control function, the ECU 20 detects changes in the booster pressure of the brake booster 30 which occur subsequent to an automatic engine stop, and effects an automatic engine restart of the engine 10 if the booster pressure falls below a predetermined value.

The brake booster 30 is coupled between the accelerator pedal 31 and the master cylinder 32, and utilizes the difference (negative pressure) between atmospheric pressure and the engine intake air pressure to generate force which assists the vehicle driver, by augmenting the force applied by the driver to depress the accelerator pedal. The brake booster 30 includes an atmospheric pressure chamber 33, into which air at atmospheric pressure is admitted when the accelerator pedal 31 is depressed, and a negative-pressure chamber 34 from which air can flow to the intake manifold of the engine, via a vacuum hose 35 and a non-return valve (check valve) 36.

The term "negative pressure" is used herein to signify a pressure lower than atmospheric pressure, and the term "value of booster pressure" refers to the negative pressure value which is the difference between atmospheric pressure and the pressure within the negative-pressure chamber 34.

The degree of braking assistance force applied by the brake booster 30 depends upon the booster pressure, and hence upon the intake air pressure of the engine 10. The non-return valve 36 enables air to flow into the vacuum hose 35 from the negative-pressure chamber 34 only when the pressure value in the intake manifold is more negative than the booster pressure. This ensures that the booster pressure will be maintained at a negative value for a short time after the engine 10 is stopped.

The negative pressure chamber 34 is coupled to a booster pressure sensor 37 which supplies a detection signal indicative of detected values of booster pressure to the ECU 20. After the engine 10 has become halted by an automatic engine stop operation, the ECU 20 calculates the booster pressure value based on the detection signal from the booster pressure sensor 37. If it is judged that the booster pressure has fallen below a predetermined value, the ECU 20 performs operations for automatically restarting the engine 10.

In the prior art, if the ECU 20 were unable to determine that the booster pressure had fallen below the predetermined value after the engine had become stopped, the ECU 20 would be unable to recognize that the brake booster 30 cannot provide sufficient braking assistance to the vehicle driver. However with this embodiment, the ECU 20 effects an automatic engine restart if either of two conditions is detected, i.e.: that the booster pressure has fallen below the predetermined value after the engine become halted (by the automatic engine stop function), or that a predetermined time interval has elapsed since the engine become halted by an automatic engine stop operation.

Hence even if the ECU 20 becomes unable to detect that the booster pressure had fallen below the predetermined value after the engine had become stopped, it becomes possible to prevent a condition whereby the brake booster 30 ceases to provide braking assistance to the driver after an automatic engine stop has occurred. For example, the booster pressure sensor 37 may become defective such that the detection signal becomes stuck at an upper or lower limit of its range (e.g., 0 V or 5 V). In such a case, the ECU 20 would be capable of detecting that the booster pressure sensor 37 has become defective. However the booster pressure sensor 37 may become defective such that the detection signal becomes stuck at an intermediate value within its range, in which case the defective condition would not be recognized by the ECU 20.

Figure 2:
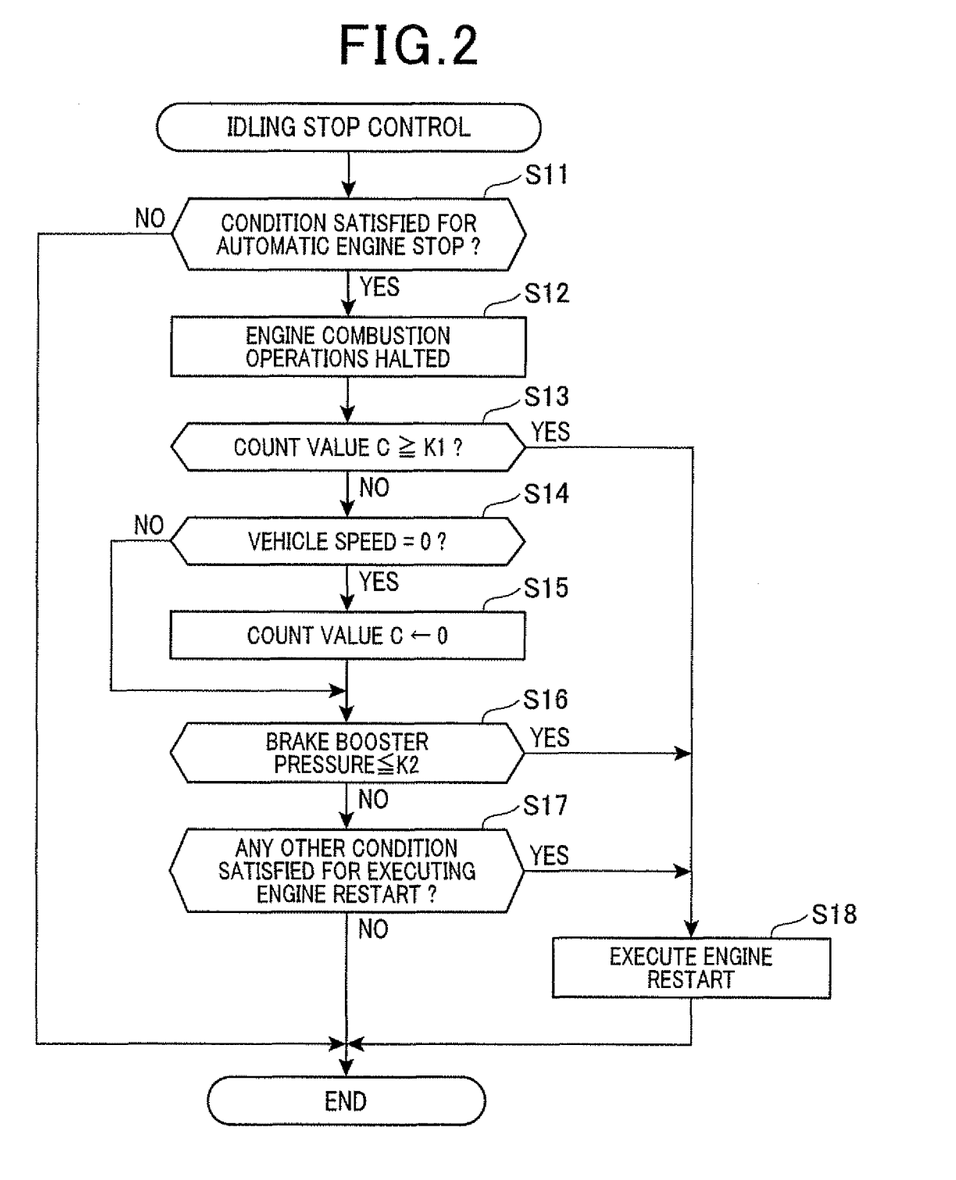
FIG. 2 is a flow diagram of idling stop control processing executed by the first embodiment.

FIG. 2 is a flow diagram of a control processing routine which is repetitively executed by the ECU 20 at fixed intervals.

Firstly in step S11 a decision is made as to whether a predetermined combination of conditions for an automatic engine stop are satisfied. These conditions include:
(1) the driver is depressing the brake pedal
(2) the vehicle speed is lower than a predetermined value (e.g., 10 km/h)
(3) the booster pressure sensor 37 is not judged to be defective If all of these conditions are satisfied (YES decision in step S11) operation then proceeds to step S12, while if there is a NO decision, the processing routine is terminated.

In step S12 combustion operations are halted, i.e., the supplying of fuel to the cylinders is halted and ignition operations are halted, thereby stopping the engine 10.

Following step S12, in step S13, a decision is made as to whether the predetermined time interval has elapsed since the automatic engine stop commenced. Specifically, a decision is made as to whether a count value C has reached a judgement value K1, corresponding to a predetermined elapsed time interval TA. The count value C is reset to zero when an automatic engine start operation is performed, and commences counting up from zero when an automatic engine stop is executed. The time interval TA is established based on an assumed rate of drop of the booster pressure after the engine has stopped. This rate of drop of booster pressure depends upon various factors, which can be detected by the ECU 20. For example, if the vehicle driver is pumping the brake pedal after the engine has stopped, then the rate of fall of booster pressure will be relatively high. For that reason, the time interval TA can appropriately be predetermined as the minimum amount of time which would be expected to be required for the booster pressure to reach a predetermined value K2 (for example, −20 kPa) after the engine has stopped, under a worst-case condition for rate of fall of the booster pressure (e.g., a condition whereby brake pumping is being performed).

For example, if it is assumed that the booster pressure may fall from −50 kPa to −20 kPa at a rate of 3 kPa/sec after the engine has stopped (e.g., in a worst-case condition whereby the booster pressure falls rapidly due to brake pumping by the driver) then an appropriate value for the predetermined time interval TA will be 10 seconds.

If it is judged in step S14 that the count value C is less than K1, then step S14 is executed, while if C is ≥K1, S18 is executed. In step S14, a decision is made as to whether the vehicle speed has become zero. If the vehicle speed has reached zero, then step S15 is executed in which the count value C is reset to zero, and operation then proceeds to step S16. If it is judged that the vehicle speed has not yet reached zero, step S16 is then directly executed.

In step S16, a decision is made as to whether the booster pressure remains above the judgement value K2. If the booster pressure is above K2, operation then proceeds to step S17, while otherwise, S18 is executed.

In step S17, a decision is made as to whether the ECU 20 has detected any other condition for performing an automatic engine restart. Such other conditions can include for example, that the battery voltage VB has fallen below a predetermined value while the engine 10 is halted, so that it is necessary to restart the engine for driving the generator (alternator) to recharge the battery, or that an abnormal condition of the booster pressure sensor 37 has been detected while the engine 10 is halted. If any of these conditions for automatic engine restart is satisfied, step S18 is then executed, while otherwise, the processing is terminated. In step S18, operations including cranking the engine 10 by the starter motor 16 are performed, to restart the engine 10, and the count value C is reset to zero.

The engine may also be restarted automatically in response to predetermined actions by the vehicle driver (e.g., depressing the accelerator pedal when the vehicle has become halted, after an automatic engine stop).

If the ECU 20 determines that any of the conditions of steps S13, S16 and 817 are satisfied, engine restarting is performed in response to the earliest one of these conditions that becomes satisfied.

Following a NO decision in step S13, if it is judged in step S14 that the vehicle speed is zero, the count value C is reset to zero in step S15. The effects of this are as follows. If the booster pressure cannot be correctly obtained by the ECU 20, e.g., if the booster pressure sensor 37 is defective, then it may be incorrectly judged in step S16 that the booster pressure is greater than the judgement value K2 (i.e., NO decision in step S16). However even if this occurs, there is no danger that the booster pressure will be allowed to fall to a dangerous level.

Specifically, while the engine 10 is running, the processing routine of FIG. 2 is repetitively executed with the count value C reset to zero. In an execution initiated while the engine 10 is running, step S12 may be performed, thereby stopping the engine, and incrementing of the count value C (measurement of elapsed time) from zero then commences. The count reset step S15 is skipped in each of successive executions of the processing routine, until the vehicle becomes halted (i.e., until a YES decision reached in an execution of step S14). Hence even if the booster pressure sensor 37 is defective and incorrectly indicates that the booster pressure is greater than the judgement value K2, the count value C will successively increase until (if no other condition for restarting becomes satisfied first) the judgement value K1 is reached, i.e., until a predetermined maximum amount of time has elapsed since the engine becomes stopped.

An automatic engine restart will thereby be performed in step S18, before the booster pressure can have fallen to an excessively low level, irrespective of the defective condition of the booster pressure sensor 37. It is thereby ensured that braking assistance will be provided by the brake booster 30 after an automatic engine stop has occurred, so long as the vehicle is in motion, even if the ECU 20 is unable to correctly obtain the actual value of booster pressure.

While the vehicle is halted (YES decision in each execution of step S14), the count value C is repetitively reset to zero in executions of step S15, thereby ensuring that an automatic engine restart will not be performed (by a YES decision in step S14) due to C attaining the judgement value K1.

It can thus be understood that a lower priority is placed on automatic restarting of the engine 10 after the vehicle has become halted, by comparison with performing automatic engine restarting while the vehicle is in motion. This ensures that fuel saving is achieved, by holding the engine in the stopped condition to avoid engine idling when possible, while also ensuring that normal braking assistance will continue to be provided by the brake booster 30 (following an automatic engine stop) so long as the vehicle is moving.

Figures 3A, 3B:
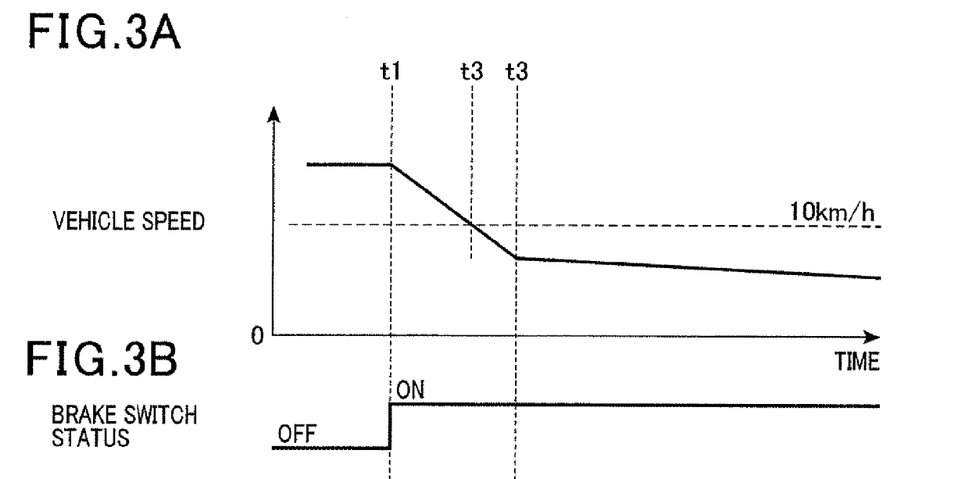
FIGS. 3A-3F show timing diagrams of a specific example of idling stop control, executed by the first embodiment.
Figure 3C:
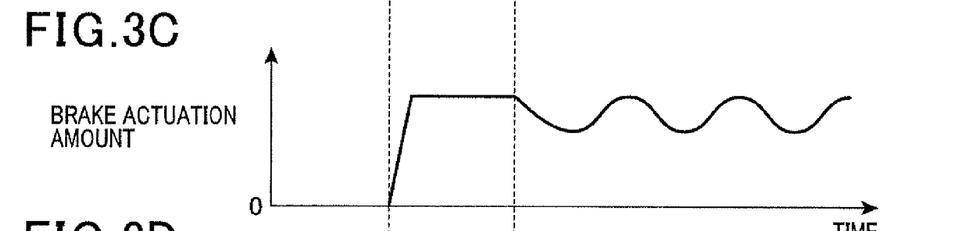

The timing diagrams of FIGS. 3A to 3F illustrate an example of automatic engine stop control executed by this embodiment, when the vehicle is running on a downward slope. At time point t1, the vehicle driver begins to actuate the brake pedal (FIG. 3B) causing the vehicle speed (shown in FIG. 3A) to be gradually reduced by braking. Variations in the brake actuation amount are shown in FIG. 3C. When the speed reaches a predetermined value (10 km/h), at time point t2, the requirements for executing an automatic engine stop are satisfied, and combustion operations of the engine 10 are halted by cutting off the supply of fuel, etc., stopping the engine 10. It is assumed that the vehicle thereafter runs in a freewheeling condition, using the downward slope to continue moving.

As the vehicle continues to run down the slope, at time point t3 the vehicle driver commences brake pumping, (modulating the brake actuation amount) such that the vehicle speed becomes approximately constant. As a result of the brake pumping, the booster pressure falls more rapidly following time point t3, and at time point t4, the booster pressure attains the judgement value K2. When this is detected, an automatic engine restart of the engine 10 is performed as described above.

When the engine restarting has been completed, the booster pressure begins to rise, ensuring that sufficient braking assistance is provided by the brake booster 30. It is thereby ensured that the vehicle driver will not experience a sensation, when applying the brake, different from that when an automatic engine stop has not been performed.

If the fall in booster pressure to the judgement value K2 is reliably detected, then the engine 10 will be halted at time point t4. However with this embodiment, even if the booster pressure sensor 37 is defective, causing detection abnormality, it is ensured that the booster pressure is not allowed to fall excessively. Specifically, even if the ECU 20 does not obtain detection information indicating that the booster pressure has fallen below the judgement value K2 at time point t4 shown in FIG. 3D, the count value C will reach the judgement value K1 at time point t5, i.e., at a time which is not significantly delayed from the time point t4 (when the booster pressure reached the judgement value K2). Hence, an automatic engine restart will be performed at time point t5, so that an excessive fall in the booster pressure is reliably prevented.

The following effects are thus provided by this embodiment.

After the engine 10 has become halted by an automatic engine stop operation, if it is judged that the booster pressure has fallen below a predetermined value or that a predetermined time interval has elapsed since the engine became halted, an automatic engine restart is executed. Hence even if the ECU 20 becomes unable to ascertain that the actual booster pressure has fallen below a predetermined value (K2), the brake booster 30 will apply appropriate braking assistance.

In particular, if the vehicle is running on a downhill slope after an automatic engine stop occurs, the embodiment ensures that appropriate braking assistance will be provided by the brake booster 30, to facilitate continued running at low speed.

It should be noted that it would be possible to modify the above embodiment, to implement various alternative embodiments as described in the following.

First Alternative Embodiment

Figure 6:
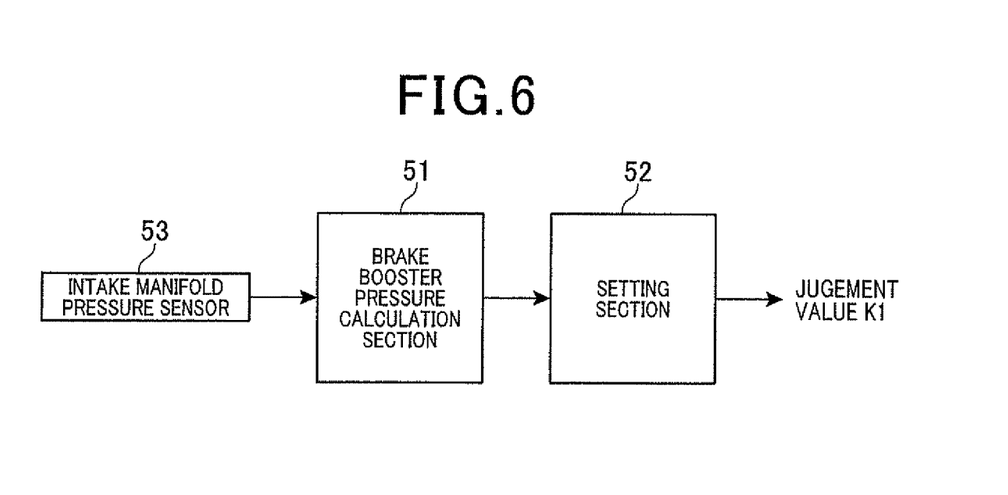
FIG. 6 is a diagram illustrating a second method of deriving the judgement value K1, utilized by a third alternative embodiment.
Figure 8:
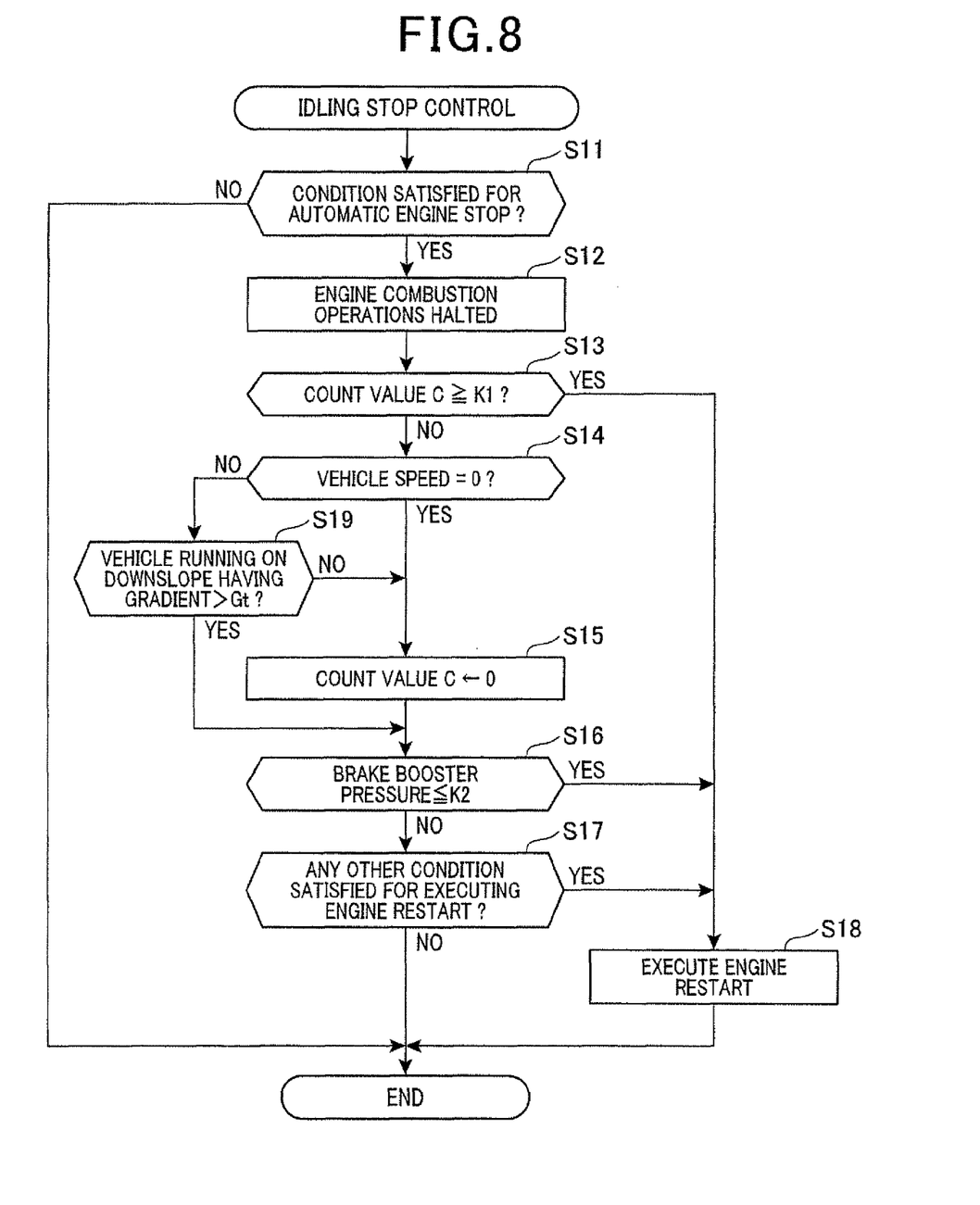
FIG. 8 is a flow diagram of processing executed by a first alternative embodiment.

FIG. 8 is a flow diagram of a first alternative embodiment, having a function for obtaining the value of slope gradient (e.g., as illustrated in FIG. 6, or by using a slope sensor installed on the vehicle) when the vehicle is running downhill on a sloping road surface. The operation of this embodiment is as follows. When an automatic engine stop is executed while the vehicle is running downhill, and the gradient of the slope exceeds a predetermined threshold value Gt, a limit is placed on the maximum amount of time that can elapse before an automatic engine restart is performed (i.e., the count value C is not repetitively reset). However after the automatic engine stop has been executed, so long as the vehicle is not running on a downhill slope or is running on a downhill slope having a gradient which does not exceed the threshold value Gt, no limit is placed on the time that elapses until an automatic engine restart is performed (i.e., the count value C is repetitively reset to zero).

The automatic engine stop and automatic engine restart control operation of the ECU 20 with this embodiment is illustrated by the timing diagram of FIG. 8. Only the differences with respect to the operation of the first embodiment shown in FIG. 2 will be described. As shown, if it is judged in step S14 that the vehicle is in motion (NO decision) after an automatic engine stop has been executed, then a decision is made in step S19 as to whether the vehicle is running on a downhill slope having a gradient that exceeds the threshold value Gt. If that is the case (YES decision) then the judgement step S16 is executed, while otherwise (NO decision) step S15 is executed to reset the count value C to zero.

It can be understood that the operation of this embodiment differs from the first embodiment only with respect to the effects of the judgement made in the added step S19.

The basis for this alternative embodiment is as follows. Following an automatic engine stop, when the vehicle is running on a road surface other than on a steep downhill slope, the booster pressure can be expected to fall only at a moderate rate. Hence, even if the engine does not become restarted when the predetermined time interval (e.g., 10 seconds) has elapsed, this is unlikely to result in a problem. However if the slope gradient exceeds the predetermined threshold value, then the engine will be restarted when the predetermined time interval has elapsed.

Thus with this embodiment as for the first embodiment, priority is given to economizing fuel by reducing the frequency of engine restarting as far as possible, while ensuring that sufficient braking assistance is provided by restarting the engine to restore the booster pressure, when appropriate.

Second Alternative Embodiment

Figure 4:
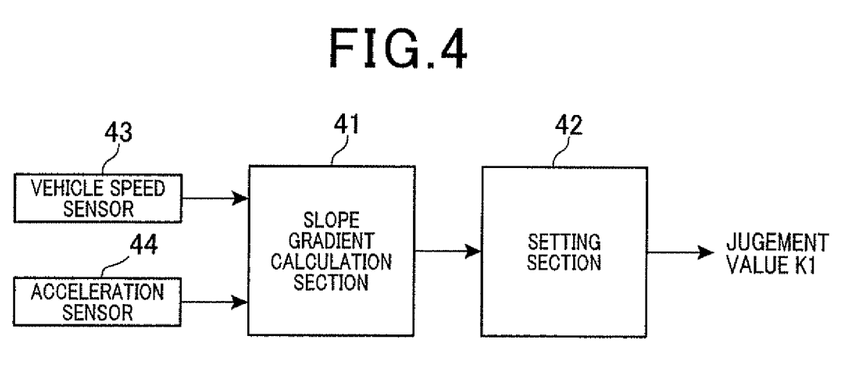
FIG. 4 is a diagram illustrating a first method of setting a judgement value K1, utilized by a second alternative embodiment.

It is possible to modify the first embodiment, such that when it is detected that the vehicle is running down a slope after an automatic engine stop has occurred, the maximum amount of time which can elapse until the engine is restarted will be adjusted in accordance with the gradient of the slope. As illustrated in FIG. 4, such an alternative embodiment further includes a gradient calculation section 41, which obtains vehicle speed and acceleration information from a vehicle speed sensor 43 and a vehicle acceleration sensor 44. When the vehicle is running down a slope, the gradient calculation section 41 uses the supplied information to calculate the gradient of the slope. A setting section 42 sets the judgement value K1 based upon the value of the gradient.

The functions of the gradient calculation section 41 and the setting section 42 are preferably implemented by processing executed by the ECU 20, i.e., which receives detection signals from the vehicle speed sensor 43 and the acceleration sensor 44. This processing is performed as an additional step, (executed once, after a YES decision is made in step S11, prior to step S13) in the flow diagram of FIG. 2. In other respects, the operation of such an embodiment is as described for the first embodiment, with the set value of K1 being compared with the count value C in step S13 of FIG. 2.

Instead of utilizing detected values of vehicle speed and acceleration to calculate the slope gradient, it would be equally possible to utilize a slope sensing device installed on the vehicle, with a detection signal from such a device being supplied to the ECU 20. Alternatively, the gradient slope could be derived based on information specifying the location of the vehicle and on topographic information for a map of the region in which the vehicle is located.

Figure 5:
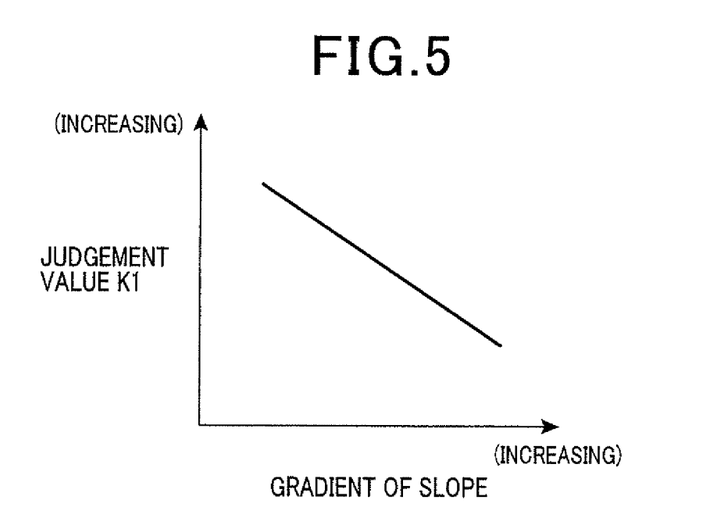
FIG. 5 is a graph illustrating a relationship between values of K1 and values of gradient of a downward slope on which the vehicle is running, for the second alternative embodiment.

With this alternative embodiment, the setting section 42 sets the judgement value K1 in accordance with a relationship of the form shown in FIG. 5. Here, as the gradient of the slope increases, the judgement value K1 becomes accordingly smaller. Hence when the vehicle is running downhill in a freewheeling condition after an automatic engine stop, the steeper the gradient of the road, the shorter will become the maximum time duration before the engine will be automatically restarted.

Figure 3D:
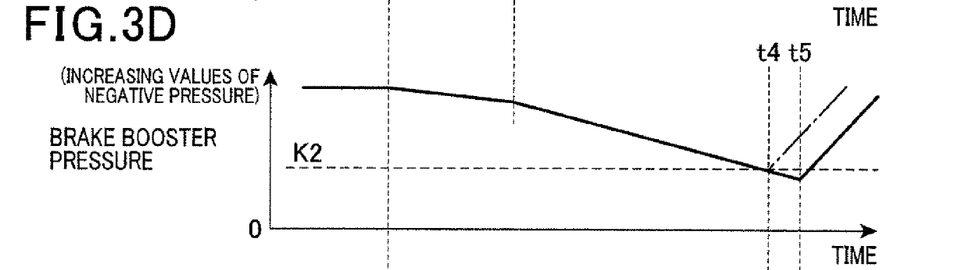
Figure 3E:
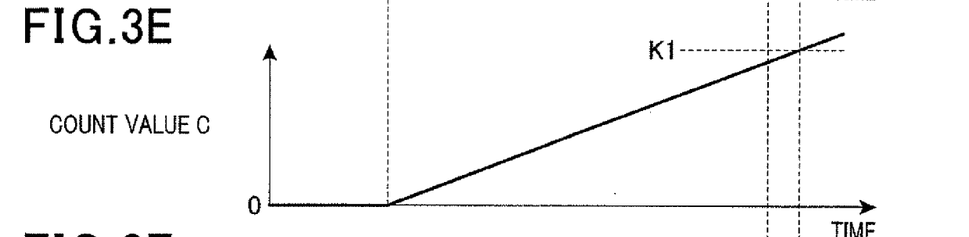
Figure 3F:
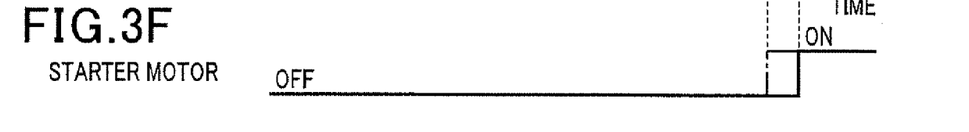

As the downhill gradient increases, it can be expected that the vehicle driver will actuate the brake pedal more frequently or pump the brake pedal, thereby rapidly lowering the booster pressure and so shortening the time until the booster pressure falls below the judgement value K2, as illustrated in FIG. 3D above. For that reason, this embodiment adjusts the value of K1 in accordance with the steepness of the downhill slope, such that as the slope gradient increases, a corresponding decrease is made in the maximum amount of time that can elapse before an automatic engine restart is performed, following an automatic engine stop.

Third Alternative Embodiment

With a third alternative embodiment, the maximum amount of time which can elapse until the engine is automatically restarted, following an automatic engine stop, is determined based upon the booster pressure value at the point in time when a condition for executing that automatic engine stop operation becomes satisfied (i.e., a time point immediately before the engine becomes stopped).

With this embodiment, the vehicle is provided with an intake manifold pressure sensor 53 for detecting the intake air pressure of the engine. As illustrated in FIG. 6, detected intake air pressure values are supplied from the sensor 53 to a booster pressure calculation section 51, for use in calculating successive values of the booster pressure (i.e., estimated values which are unaffected by any actuations of the brake pedal 31). The calculated values are supplied to a setting section 52. When a condition for executing an automatic engine stop become satisfied, then before the engine becomes stopped, the setting section 52 sets the judgement value K1 based upon the calculated booster pressure value at that time.

The functions of the booster pressure calculation section 51 and the setting section 52 are preferably performed by ECU 20, i.e., as a processing step which is executed once (prior to step S13) after a YES decision has been reached in step S11.

Figure 7:
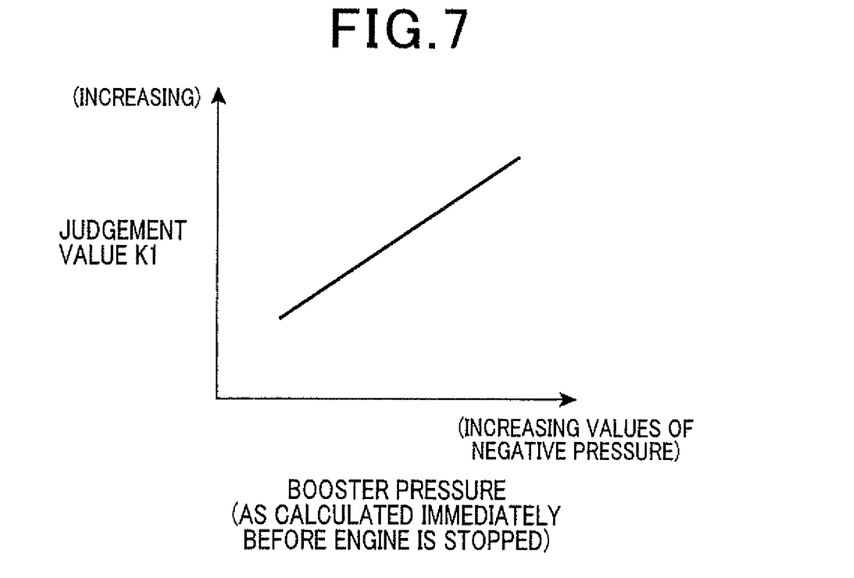
FIG. 7 is a graph illustrating a relationship between the values of the judgement value K1 and corresponding values of booster pressure, as obtained immediately prior to an automatic engine stop operation, for the third alternative embodiment.

With this alternative embodiment, the setting section 52 sets the judgement value K1 in accordance with a relationship of the form shown in FIG. 7. Here, as the booster pressure (immediately prior to an automatic engine stop) decreases, the judgement value K1 is made accordingly smaller, i.e., the maximum time that can elapse before the engine 10 will be restarted is decreased accordingly.

It would be further possible for an alternative embodiment to combine both of the functions shown in FIG. 4 and FIG. 6. In that way, the judgement value K1 would be determined based on both the magnitude of the slope gradient (when the vehicle is traveling on a downhill slope) and the booster pressure (as obtained immediately before an automatic engine stop occurs).

What is claimed is:

1. An engine control apparatus for executing an automatic engine stop operation to halt combustion operations of an internal combustion engine of a vehicle when a predetermined condition for executing the automatic engine stop operation is satisfied, and for executing an automatic engine restart operation to restart the engine, by operations including driving a starter motor of the engine, when a predetermined condition for executing the automatic engine restart engine restart operation is satisfied, the vehicle being equipped with a vacuum-boost type of brake booster which utilizes a booster pressure to augment an actuation force applied to a brake pedal of the vehicle, the booster pressure having a negative value and being derived from an intake air pressure of the engine, the engine control apparatus comprising a booster pressure sensor for obtained successive detected values of the booster pressure, and wherein the engine control apparatus comprises:
first judgement circuitry configured for repetitively judging, subsequent to executing the automatic engine stop operation, whether a currently detected value of the booster pressure is less negative than a predetermined negative value,
second judgement circuitry configured for judging whether a predetermined time interval has elapsed following execution of the engine stop operation, and
starting control circuitry configured for executing the automatic engine restart operation in response to a first condition for restarting becoming satisfied, the first condition for restarting being that the first judgment circuitry has judged the booster pressure to have become less negative than the predetermined negative value, or in response to a second condition for restarting becoming satisfied, the second condition for restarting being that the second judgement circuitry has judged the predetermined time interval to have elapsed;
the automatic engine restart operation being executed in response to an earliest one of the first condition for restarting and the second condition for restarting to become satisfied;
and wherein
the engine control apparatus comprises booster pressure calculation circuitry configured for calculating the booster pressure value at a time point when a condition for executing the automatic engine stop operation becomes satisfied; and,
the second judgement circuitry comprises setting circuitry configured for setting the duration of the predetermined time interval in accordance with the calculated booster pressure value.

2. The engine control apparatus according to claim 1, wherein the booster pressure calculation circuitry is configured for calculating the booster pressure value based upon a detected value of intake air pressure of the engine.

3. An engine control apparatus for executing an automatic engine stop operation to halt combustion operation of an internal combustion engine of a vehicle when a predeterminded condition for executing the automatic engine stop operation is satisfied, and for executing an automatic engine restart operation to restart the engine, by operations including driving a starter motor of the engine, when a predetermined condition for executing the automatic engine restart operation is satisfied, the vehicle being equipped with a vacuum-boost type of brake booster which utilizes a booster pressure to augment an actuation force applied to a brake pedal of the vehicle, the booster pressure having a negative value and being derived from an intake air pressure of the engine, the engine control apparatus comprising a booster pressure sensor for obtained successive detected values of the booster pressure, and wherein the engine control apparatus comprises:
first judgement circuitry configured for repetitively judging, subsequent to executing the automatic engine stop operation, whether a currently detected value of the booster pressure is less negative than a predetermined negative value,
second judgement circuitry configured for judging whether a predetermined time interval has elapsed following execution of the engine stop operation, and
starting control circuitry configured for executing the automatic engine restart operation in response to a first condition for restarting becoming satisfied, the first condition for restarting being that the first judgement circuitry has judged the booster pressure to have become less negative than the predetermined negative value, or in response to a second condition for restarting becoming satisfied, the second condition for restarting being that the second judgement circuitry has judged the predetermined time interval to have elapsed;
the automatic engine restart operation being executed in response to an earliest one of the first condition for restarting and the second condition for restarting to become satisfied;
and wherein
the engine control apparatus comprises a device or circuitry configured for detecting a specific status of the vehicle whereby the vehicle is running downhill on a slope and whereby a gradient of the slope exceeds a predetermined value, and
the starting control circuitry is configured for inhibiting execution of the automatic engine restart operation in response to the second condition for restarting becoming satisfied, when the specific status of the vehicle is detected.

4. An engine control apparatus for executing an automatic engine stop operation to halt combustion operation of an internal combustion engine of a vehicle when a predetermined condition for executing the automatic engine stop operation is satisfied, and for executing an automatic engine restart operation to restart the engine, by operations including driving a starter motor of the engine, when a predetermined condition for executing the automatic engine restart operation is satisfied, the vehicle being equipped with a vacuum-boost type of brake booster which utilized a booster pressure to augment an actuation force applied to a break pedal of the vehicle, the booster pressure having a negative value and being derived from an intake air pressure of the engine, the engine control apparatus comprising a booster pressure sensor for obtained successive detected values of the booster pressure, and wherein the engine control apparatus comprises:
first judgement circuitry configured for repetitively judging, subsequent to executing the automatic engine stop operation, whether a currently detected value of the booster pressure is less negative than a predetermined negative value,
second judgement circuitry configured for judging whether a predetermined time interval has elapsed following execution of the engine stop operation, and
starting control circuitry configured for executing the automatic engine restart operation in response to a first judgement circuitry has judged the booster pressure to have become less negative than the predetermined negative value, or in response to a second condition for restarting becoming satisfied, the second condition for restarting being that the second judgement circuitry has judged the predetermined time interval to have elapsed;

the automatic engine restart operation being executed in response to an earliest one of the first condition for restarting and the second condition for restarting to become satisfied; and wherein the engine control apparatus comprises a device or circuitry configured for detecting a specific status of the vehicle whereby the vehicle is running downhill on a slope, and for detecting a value of a gradient of the slope; and the second judgement circuitry comprises setting circuitry configured for setting the duration of the predetermined time interval based upon the value of the gradient, when the specific status is detected.

* * * * *